June 14, 1955  R. H. LEE  2,710,938
REGULATED RECTIFIER POWER SUPPLY SYSTEM
Filed Nov. 22, 1952
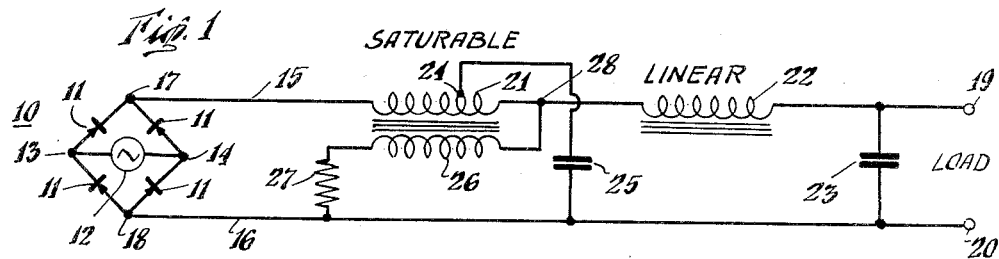
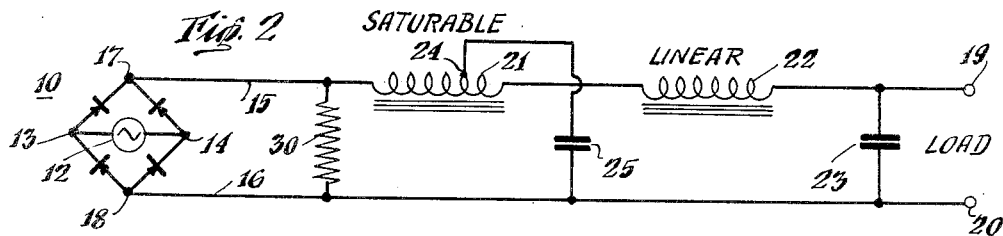
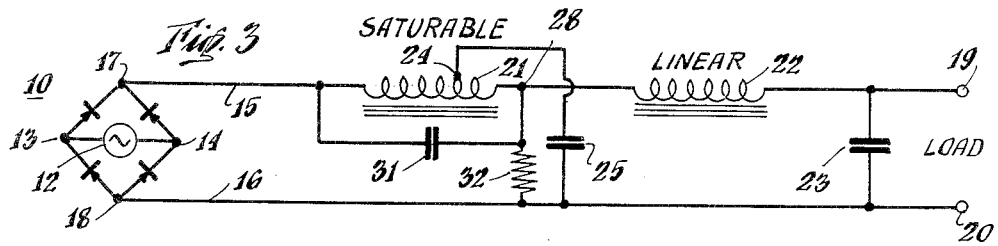
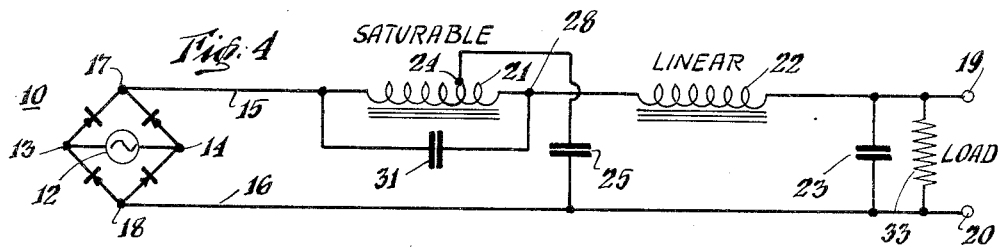
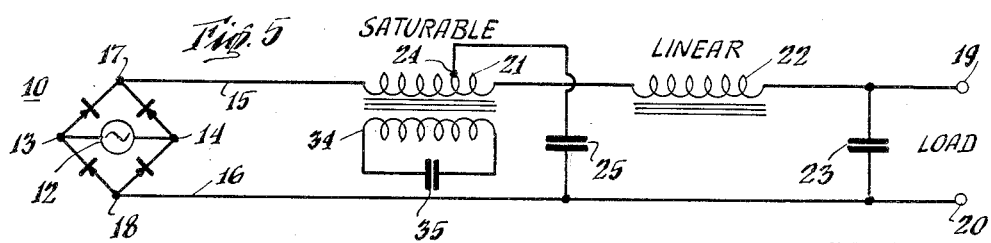
INVENTOR.
Robert H. Lee
BY
ATTORNEY

United States Patent Office 2,710,938
Patented June 14, 1955

2,710,938

REGULATED RECTIFIER POWER SUPPLY SYSTEM

Robert H. Lee, Indianapolis, Ind., assignor to P. R. Mallory & Co., Inc., Indianapolis, Ind., a corporation of Delaware Application November 22, 1952, Serial No. 322,111

7 Claims. (Cl. 321—25)

This invention relates to rectifier power supply systems and, more particularly, to power supply systems capable of delivering direct current of substantially constant voltage under variable load conditions.

In the manufacture of rectifier equipment, there are normally impedances in the circuit which result in the output voltage of the rectifier dropping off as the load is increased. This is generally undesirable in that most practical applications for direct current power require substantially constant voltage with considerable variations of load. Prior suggestions in this direction were quite numerous but they either did not provide the desired degree of regulation or they added considerably to the cost of the power supply system and for this reason were not satisfactory on a practical and commercial scale.

I have discovered that the problem may be solved in a simple and completely satisfactory manner.

It is an object of the present invention to improve regulated rectifier power supply systems.

It is another object of the present invention to provide a novel regulated rectifier power supply system capable of delivering substantially constant direct current output voltage under conditions of considerable load variations.

It is a further object of the invention to provide a rectifier power supply system characterized by good voltage regulation at a cost not substantially exceeding that of conventional non-regulated power supplies.

It is also within the contemplation of the invention to provide an improved regulating system which is applicable to any single-phase rectifier circuit, such as to rectifier circuits of the bridge, full-wave center-tapped, half-wave, or voltage multiplier type embodying rectifiers of any type, for example tube, copper oxide, selenium, magnesium-copper sulphide rectifiers, and the like.

The invention also contemplates a regulated rectifier power supply system wherein the regulating system also provides filtering of the direct current voltage along with its function of regulating such voltage.

Other and further objects and advantages of the present invention will become apparent from the following description, taken in conjunction with the accompanying drawing, in which Fig. 1 is a circuit diagram of a regulated power supply system embodying the principles of the present invention; and Figs. 2-5 are similar circuit diagrams showing certain modifications of the invention.

Broadly stated, in accordance with the principles of my invention, I provide a regulated rectifier power supply system comprising a saturable choke having a tap, said saturable choke being connected in series with a second choke which is preferably linear. The two serially connected chokes are arranged in series connection between the rectifier and the load circuit. Preferably, a filter condenser is connected in shunt across the load, although the provision of such filter condenser is not necessary in all cases. A condenser is connected between the tap on the saturable choke and the other output line of the rectifier. The circuit may be completed in a number of different ways of which the most important ones are the following:

1. An additional winding may be provided on the saturable choke, one end of which is connected to the common terminal of the saturable and linear chokes, while its other end is connected to the opposite direct current line of the rectifier through a bleeder resistor.

2. A bleeder resistor is connected directly across the output terminals of the rectifier.

3. A bleeder resistor is connected between the common terminal of the two chokes and the other direct current line from the rectifier, in combination with a condenser connected across all or a portion of the saturable choke.

4. A bleeder resistor is connected across the load circuit in combination with a condenser connected across all or a portion of the saturable choke.

The basic principle underlying the operation of these circuits is that the direct current output voltage from a rectifier system having other square-wave input to the rectifier is determined to a degree by the amount of second harmonic current flow in the output circuit. Thus, with a filter condenser placed across the output from a rectifier, the voltage, in general, will be boosted above that value which would be obtained without the condenser. The theoretical limit of this action with sine-wave input voltage to the rectifier and with a perfect rectifier having no voltage drop is approximately 55% higher with the condenser than without the condenser across the output terminals of the rectifier. In actual practice, the impedance of the circuit in back of the rectifier, and of the rectifier itself, reduces this value of 55% to a much lower figure when the rectifier is loaded. The regulating system of the invention operates by allowing a minimum of harmonic current to flow during conditions of light load. As the load is increased, the amount of second harmonic current flow is allowed to increase at a disproportionately higher rate so that, under full-load operation, the system performs as though there were a condenser connected directly across the output of the rectifier.

The operation of saturable reactors is determined by the fundamental relationship of D. C. ampere turns equaling A. C. ampere turns. In practice, this relationship is merely approximate in that iron and copper losses in the reactor absorb part of the A. C. ampere turns so that, in order to maintain control of a system by means of saturable reactors, it is necessary that the D. C. ampere turns slightly exceed the A. C. ampere turns. In the system of the present invention, the control is effected by means of limiting the second harmonic current flow through the variable, self-controlled, tapped saturable reactor. The tap on the reactor provides a path for the second harmonic current to flow to the condenser. The D. C. output current is passed through the entire reactor and thus provides a higher number of direct current turns for the direct current to traverse than there is for the A. C. second harmonic current to traverse. Thus, by the position of the tap on the reactor, it is possible to predetermine the maximum possible A. C. second harmonic current flow as a ratio of the direct current, and it is further possible to allow more second harmonic current to flow than the direct current demanded by the load.

The purpose of the bleeder resistor and condenser combinations disclosed in the foregoing is to reduce the direct current output voltage at light loads to its desired value. This is accomplished by one of the following two expedients or by a combination thereof:

1. Suppression of the harmonic current flow at light load by means of tuning the saturable choke to the second harmonic voltage.

2. By bleeding direct current without taking a proportionate amount of harmonic current so that the ratio of harmonic current to direct current is reduced.

Referring now more particularly to Fig. 1 of the drawing, reference numeral 10 generally denotes a full-wave rectifier comprising four rectifier junctions 11 connected in the form of the conventional bridge circuit. A source of alternating current 12 is connected to input terminals 13 and 14 of the bridge and direct current output lines 15 and 16 are respectively connected to output terminals 17 and 18 of the bridge.

Load terminals 19 and 20 are provided for connecting an external load to the circuit. Of these, terminal 20 is directly connected to output terminal 18 of the rectifier through lead 16 while terminal 19 is connected to output terminal 17 of the rectifier through lead 15, a saturable reactor or choke 21, and a preferably linear reactor or choke 22. A filter condenser 23 is connected directly across load terminals 19 and 20.

Tap 24 on saturable reactor 21 is connected to output lead 16 through a condenser 25. A bleeder circuit comprising an additional winding 26 on saturable choke 21 and a bleeder resistor 27 connected in series therewith is connected between common terminal 28 of chokes 21 and 22 and output lead 16.

From the foregoing detailed description of the principles of the present invention, the operation of this circuit will be readily understood by those skilled in the art without any detailed explanation. It will be sufficient to state that, on light loads, the impedance of saturable choke 21 will be quite high so that only a minimum of second harmonic current will be permitted to flow to condenser 25. As the load is increased, the impedance of choke 21 is decreased as a result of its progressive saturation so that the amount of second harmonic current flow to condenser 25 is allowed to increase at a disproportionately higher rate thereby compensating for the voltage drop in the rectifier and other parts of the circuit caused by the higher load current. Under full load operation, the impedance of the saturated choke 21 drops to a very low value and thus condenser 25 is effectively connected directly across the output terminals 17, 18 of the rectifier so that the voltage increasing effect of such condenser is at its maximum. The function of bleeder circuit 26, 27 is to bleed direct current from the system without taking a proportionate amount of harmonic current so that the ratio of harmonic current to direct current is minimized, thereby reducing the direct current voltage to its proper value under light load conditions.

The circuit shown in Fig. 2 is closely similar to that of Fig. 1 and similar reference numerals have been used to denote corresponding parts. The only difference is that bleeder circuit 26, 27 of Fig. 1 is replaced with a single bleeder resistor 30 connected directly across output terminals 17, 18 of rectifier 10, said resistor being effective to reduce the direct current output voltage to its proper value under conditions of light load.

In the circuit of Fig. 3, a condenser 31 is connected across saturable choke 21, tuning it to the second harmonic voltage and thereby causing suppression of the harmonic current flow at light load. In addition, a bleeder resistor 32 is connected between the common terminal 28 of chokes 21 and 22 and output lead 16 for the same purpose as in the systems of Figs. 1 and 2.

The circuit of Fig. 4 is practically identical with that of Fig. 3, except for the fact that a bleeder resistor 33 is connected directly across load terminals 19 and 20.

In the circuit of Fig. 5, an additional winding 34 is provided on choke 21 having a condenser 35 connected across the same to tune the choke to the second harmonic current frequency under the minimum load condition of the system and thereby causing it to present maximum impedance to such frequency at minimum loads.

By proper design of the saturable choke, the output voltage can be held substantially constant over the entire range of loads. In general, conventional rectifier power supplies provide only regulation of the order of 30 to 50%. The rectifier power supplies of the invention make possible regulation within a range as low as 2%. In normal practice, a range of approximately 6% is used as a design center for power supplies embodying the invention.

Although the present invention has been disclosed in connection with a few preferred embodiments thereof, variations and modifications may be resorted to by those skilled in the art without departing from the principles of the present invention. All of these variations and modifications are considered to be within the true spirit and scope of the present invention, as disclosed in the foregoing description and defined by the appended claims.

I claim:

1. In a regulating system for rectifier power supplies including a source of rectified alternating current and a load, the combination which comprises first and second conductors between the source and the load, a saturable reactor and a linear reactor serially connected in the first one of said conductors, said saturable reactor having a tap thereon, and a condenser connected between said tap and said second conductor.

2. In a regulating system for rectifier power supplies including a rectifier and a load, the combination which comprises a first connection between said rectifier and load comprising a saturable reactor and a linear reactor in series therewith, said saturable reactor having a tap thereon, a second connection between said rectifier and a load, a condenser connected between said tap and said second connection, and compensating means associated with said system for reducing the output voltage under conditions of light load.

3. In a regulating system for rectifier power supplies including a rectifier and a load, the combination which comprises a first connection between said rectifier and load comprising a saturable reactor and a linear reactor in series therewith, said saturable reactor having a tap thereon, a second connection between said rectifier and load, a condenser connected between said tap and said second connection, and a compensating circuit connected between the junction of said reactors and said second connection comprising a winding inductively coupled with said saturable reactor and a bleeder resistor in series with said winding.

4. In a rectifier system including an A. C. input circuit, a rectifier, and a D. C. output circuit, the combination which comprises a first connection constituted by a saturable and a linear reactor in series therewith between said rectifier and said output circuit, said saturable reactor having a tap thereon, a second connection between said rectifier and said output circuit, a condenser provided between said tap and said second connection, and means associated with said saturable reactor for tuning it to the frequency of the second harmonic of the A. C. input voltage under the minimum load condition of the system.

5. In a rectifier system including an A. C. input circuit, a rectifier, and a D. C. output circuit, the combination which comprises a first connection between said rectifier and said output circuit constituted by serially arranged saturable and linear reactors, said saturable reactor being tuned to the frequency of the second harmonic of the A. C. input voltage and having a tap thereon, a second connection between said rectifier and said output circuit, a condenser between said tap and said second connection, and a bleeder resistor providing a path for the direct flow of current between said first and second connections.

6. In a rectifier system including an A. C. input circuit, a rectifier, and a D. C. output circuit, the combination which comprises a first connection between said rectifier and said output circuit constituted by serially arranged saturable and linear reactors, said saturable reactor having a tap thereon, a second connection between said rectifier and said output circuit, a condenser between said tap and said second connection, a winding inductively coupled with said saturable reactor, and a condenser connected across said winding for tuning said reactor to the frequency of the second harmonic of the A. C. input voltage.

7. In combination with a rectifier power supply system including a source of rectified alternating current and a load, a pair of conductors connecting said source to said load, a saturable reactor having a tap thereon and a linear reactor serially interposed in the first one of said conductors so that the said linear reactor is connected between the saturable reactor and the load, and a condenser connected between said tap and the other of said conductors, said saturable reactor being adapted to control the ripple current flow to said condenser as a function of the direct current flow through said saturable reactor thereby counteracting the voltage drop caused by increase in the load current.

References Cited in the file of this patent

UNITED STATES PATENTS

| | | |
|---|---|---|
| 1,808,589 | Amsden | June 2, 1931 |
| 1,852,125 | Miessner | Apr. 5, 1932 |
| 1,998,325 | Lyman | Apr. 16, 1935 |